United States Patent [19]

Drahos

[11] Patent Number: 4,923,243
[45] Date of Patent: May 8, 1990

[54] TRAILER TRANSPORT DEVICE

[76] Inventor: Michael W. Drahos, 10105 Dechaux Rd. E., Puyallup, Wash. 98371

[21] Appl. No.: 389,579

[22] Filed: Aug. 4, 1989

[51] Int. Cl.⁶ .............................................. B60R 15/00
[52] U.S. Cl. .................................. 296/157; 280/414.1; 280/423.1
[58] Field of Search ................................ 296/168–176, 296/157, 158; 280/414.1; 410/4, 25

[56] References Cited

U.S. PATENT DOCUMENTS

| | | | |
|---|---|---|---|
| 3,380,607 | 4/1968 | Dale | 296/157 X |
| 3,446,516 | 5/1969 | Modglin | 280/414.1 X |
| 3,556,582 | 1/1971 | Bledsoe | 296/172 X |
| 3,563,596 | 2/1971 | Davis | 296/158 |
| 3,843,161 | 10/1974 | Hastings | 280/414.1 X |
| 4,221,420 | 9/1980 | Vencill et al. | 410/24 |
| 4,420,165 | 12/1983 | Goodin | 296/158 X |
| 4,560,316 | 12/1985 | Daniels | 414/481 |
| 4,705,289 | 11/1987 | Weber | 280/414.1 |

*Primary Examiner*—Robert R. Song
*Assistant Examiner*—Obele Acha-Ngwodo

[57] ABSTRACT

An auxiliary frame structure attachable to the front end of the house trailer for supporting a boat or small automobile. The outdoorsman will be enabled to move both the trailer and the boat to a lake-front campsite, to thereby have full enjoyment of the lake for fishing or boating.

13 Claims, 2 Drawing Sheets

TRAILER TRANSPORT DEVICE

BACKGROUND AND SUMMARY OF THE INVENTION

House trailers are quite often used for camping purposes at or near lakes, rivers or the two oceans. However, if there is no boat available at the campsite the camper may not be able to fully enjoy the lake or river, etc., For fishing or boating purposes. It would be desirable if the camper could carry a small boat along with the house trailer.

This invention relates to a mechanism for transporting a house trailer and a boat (or small automobile) from one place to another. The camper or outdoorsman can then sleep in the house trailer at night, and also use the boat or small automobile during the day. A conventional pickup truck can be used as a towing vehicle for the house trailer and boat (or small automobile).

In preferred practice of the invention a horizontal platform is extended forwardly from the front end of a house trailer to form a support structure for a boat trailer (or small automobile). The front end of the horizontal platform carries a kingpin that is adapted to interengage with a fifth wheel mounted within the cargo box of a pickup truck. After the truck has transported the house trailer to each new campsite the truck can be unhitched form the platform to enable the boat trailer (or small automobile) to be moved from the platform down a ramp and onto the ground surface. When it is desired to move to a new campsite the boat trailer can be moved up the ramp and onto the platform.

THE DRAWINGS

DESCRIPTION OF A PREFERRED EMBODIMENT OF THE INVENTION

Figure 1:
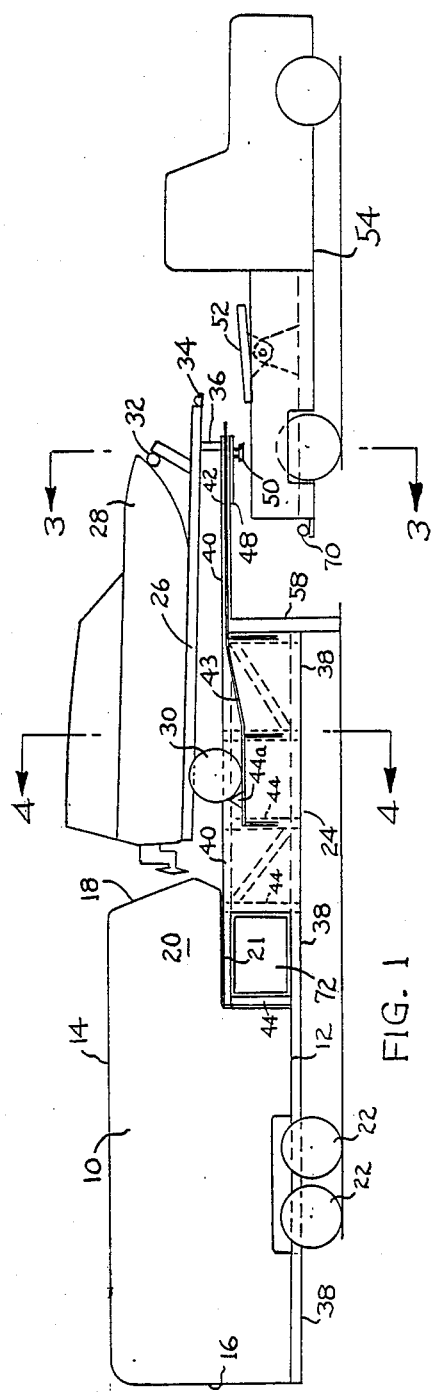
FIG. 1 is a side elevational view of a mechanism embodying the invention.

FIG. 1 in side elevation a conventional house trailer 10 that includes a bottom wall 12, roof 14, rear end wall 16, and front end wall 18. The front end portion of the trailer body comprises an upper overhang portion 20 that extends forwardly beyond the trailer body lower portion. The trailer is supported on road wheels 22; leaf springs or similar resilient suspension means (not shown) are operatively interposed between the trailer body and the road wheels.

A frame structure 24 extends forwardly from the trailer body to form a support platform for a conventional boat trailer 26 and associated boat 28. The boat trailer includes road wheels 30, a winch 32, and a wall socket hitch structure 34; additionally the trailer includes a manually operated jack mechanism 36 for raising or lowering the front end of the trailer, e.g. to facilitate attachment or detachment of the boat trailer to or from a ball-type hitch on the rear end of a towing vehicle.

Frame structure 24 includes two laterally-spaced lower beams 38 extending longitudinally underneath the trailer 10 body and forwardly a considerable distance beyond the trailer body; beams 38 are spaced equidistantly on either side of the trailer body longitudinal centerline. As shown in FIG. 1, beams 38 extend the entire length of the trailer 10 underbody to form rigid extensions of the trailer 10 frame. Beams 38 are welded to the trailer underbody at multiple points therealong so that the beams are stiffened against transverse bending stresses.

In some cases the trailer 10 frame will include longitudinal beams extending along the trailer underbody. Beams 38 can be spliced (welded) to front end sections of the trailer beams so as to extend forwardly from the lower front portion of trailer 10 at least about thirteen feet. The beams will be spaced apart approximately four feet.

Frame structure 24 includes two laterally-spaced upper beams 40 extending forwardly from the front end of trailer 10 directly above beams 38. These upper beams project forwardly beyond the lower beams to form a support platform for boat trailer 26. In lieu of a boat trailer, a small automobile could be supported on the platform. The platform can be made long enough to accommodate a range of different automobiles, e.g. a Fort Escort of a Plymouth Horizon.

Two laterally-spaced wheel support rails 42 extend along the outboard edges of beams 40. The spacing of the rails is such that the boat trailer can be positioned with its road wheels 30 located on rails 42 near the rail rear ends. Stop blocks 44a are secured to the rails to prevent trailer 26 (or a small automobile) from rolling rearwardly off of rails 42. Additionally, tie down chains, or straps, (not shown) can be trained between trailer 26 and frame structure 24 to stabilize the trailer position, especially while the mechanism is being towed on the road.

The front end portions of rails 42 extend generally horizontally along the outboard edges of beams 40; the rear end portions of rails 42 slope downwardly and rearwardly, as at 43, so that when frame structure 24 is swung (lowered) toward the ground surface (FIG. 2) the boat trailer will tend to remain in place on rails 42. The downward slope of rails 42 is also helpful in that it causes the rear end portion of boat 28 to have a somewhat lower silhouette, thereby enabling the mechanism to more readily pass under bridges (overpasses).

Lower beams 38 and upper beams 40 are preferably formed out of square cross-sectioned steel tubing. These horizontal beams are connected together by a series of vertical pillars 44, also preferably formed out of steel tubing. The frame structure further includes transverse steel tubes extending between the two beams 38, and additional steel tubes extending between the two beams 40. Sheet metal side plates 46 may be welded or otherwise attached to the beams and pillars to rigidify and cover frame structure 24.

Front end portions of beams 40 have a horizontal wear plate 48 secured thereto for mounting a vertical kingpin 50. The kingpin is located midway between beams 40 on the longitudinal centerline of frame structure 24, so as to be capable of interengagement with a fifth wheel 52 mounted in the cargo box of pickup truck 54. The truck can be backed up to lock the kingpin into the fifth wheel for towing purposes. The truck can be used to simultaneously tow house trailer 10 and boat trailer 26 (and the associated boat) from one place to another.

The boat trailer (and associated boat) can be removed from frame structure 24 by attaching two wheel support ramps 56 to front ends of rails 42. Two laterally-spaced retractable jack mechanisms 58 are connected to frame structure 24 near the front ends of beams 38 for lifting or lowering the frame structure, e.g. to support the frame structure while truck 54 is being driven away from structure 24, and also to reposition the frame structure for easier movement of boat trailer 26 off of (or onto) rails 42 (via ramps 56).

Figure 5:
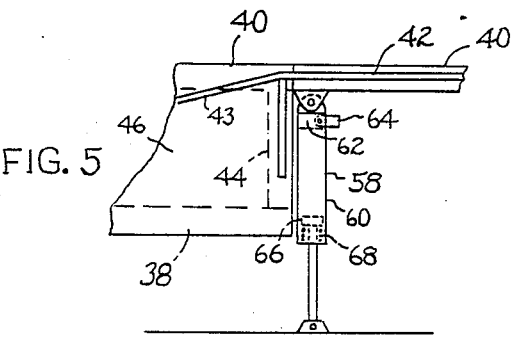
FIG. 5 is a fragmentary view showing a jack structure used in the FIG. mechanism.

Each retractable jack mechanism 58 can be of conventional design. As shown in FIG. 5, the jack mechanism comprises a hydraulic cylinder 60 extending downwardly from a hydraulic pump 62; the pump includes a pivotable socket 64 that can receive an elongated bar (level) for manual hydraulic pressurization of the cylinder space above a position 66. The hydraulic fluid can be vented into the cylinder space below piston 66 (through a manual valve) when it is desired to retract the jack mechanism; a light compression spring 68 can assist the retractive jack motion.

Figure 2:
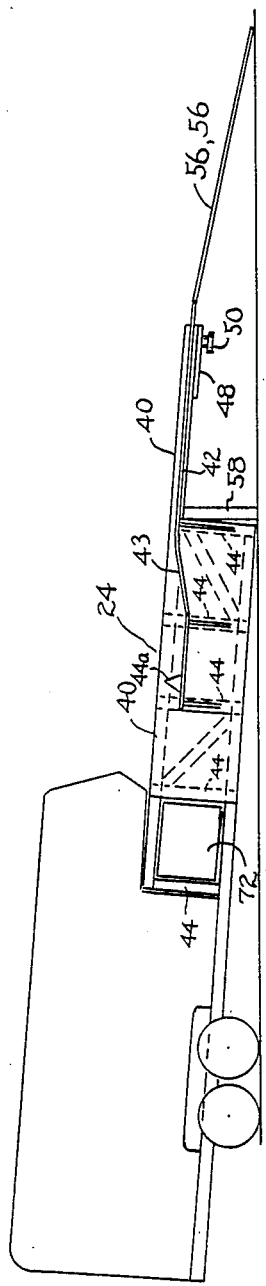
FIG. 2 is a view in the same direction as FIG. 1, but with the mechanism in a different position of adjustment.

FIG. 2 illustrates the jack mechanisms 58 retracted so that frame structure 24 is swung down to a position suitable for moving boat trailer 26 off of the platform structure (beams 40). The suspension springs for house trailer 10 permit structure 24 to swing (tilt) downwardly in a vertical arc around trailer road wheels 22.

Boat trailer 26 can be moved from its FIG. 2 position by backing the pickup truck up on ramps 56 until its ball hitch 70 mates with the hitch socket structure 34 on trailer 26; the jack mechanism 36 on trailer 26 can be operated to connect the hitch components together, after which truck 54 can be driven forwardly to pull trailer 26 (and boat 28) onto ramps 56 and then onto the ground surface. If the mechanism is used to transport a small automobile (instead of a boat trailer) then the small automobile can be driven onto (on or off) ramps 56 under its own power. Any tie-down chains or straps must be disconnected before the boat trailer or automobile is moved from the FIG. 2 position.

The illustrated frame structure 24 includes walls that form a transversely-extending storage compartment 72 below the trailer body overhang portion 20. Upper beams 40 can extend into the space below the undersurface 21 of trailer overhang 20; the storage compartment walls can be fastened to beams 38 and 40, and the associated pillars. The storage compartment walls preferably extend laterally outwardly beyond beams 38 and 40 so that the defined compartment has the same transverse width as trailer 10. Doors, not shown, may be provided to close the otherwise open ends of the storage compartment.

Figure 3:
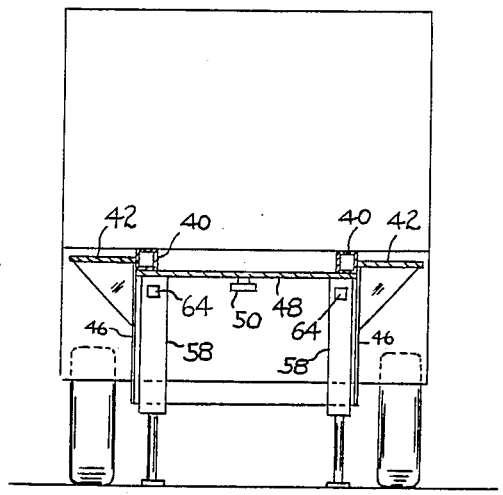
FIG. 3 is a sectional view on line 3—3 in FIG. 1.
Figure 4:
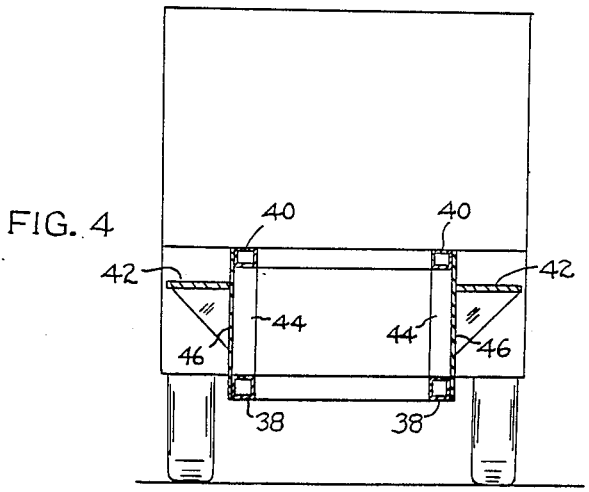
FIG. 4 is a sectional view on line 4—4 in FIG. 1.

House trailer 10 is of generally conventional design. Road wheels 22 are recessed into the trailer body so that the wheel outer faces are in approximate planar alignment with the trailer body side surfaces. As seen in FIG. 3, rails 42 have approximately the same lateral spacing as road wheels 22, such that rails 42 can accommodate the wheel spacing of conventional boat trailers. Beams 38 and 40 are spaced closer together than rails 42 so that the rails can be located outboard from the supporting frame structure 24.

The drawings necessarily show one specific form that the invention can take. The invention can be practiced in other forms.

I claim:

1. A combination trailer-vehicle carrier comprising: a house trailer body having a front end and a rear end, a frame structure extending forwardly from said trailer body, said frame structure comprising two laterally-spaced lower beams extending longitudinally underneath the trailer body, and forwardly therebeyond, two laterally-spaced upper beams extending forwardly from the front end of the trailer body directly above the lower beams, said upper beams projecting forwardly beyond the lower beams to form a platform adapted to overhang the cargo box of a pickup truck; a kingpin extending downwardly from said platform for interengagement with a fifth wheel in the truck cargo box; and two laterally-spaced wheel support rails extending longitudinally along outboard edges of said upper beams, whereby a wheeled vehicle can be supported on said rails in the space between the trailer body and the cab of the pickup truck.

2. The combination trailer-vehicle carrier of claim 1 and further comprising road wheels located below the trailer body between its front and rear ends; and retractable jack mechanisms extending downwardly from said frame structure near the front ends of said lower beams, whereby the frame structure and trailer body can be swung downwardly in a vertical arc around the trailer road wheels to facilitate movement of a vehicle onto or off of said wheel support rails.

3. The combination trailer-vehicle carrier of claim 1, wherein said wheel-support rails extend from the front ends of said upper beams to points rearwardly beyond the front ends of the lower beams.

4. The combination trailer-vehicle carrier of claim 3, wherein rear portions of said wheel-support rails slope downwardly and rearwardly so that when the trailer body and frame structure are swung downwardly around the trailer road wheels the sloped rail portions will tend the keep the wheeled vehicle in position on the rails.

5. The combination trailer-vehicle carrier of claim 1 wherein the upper front-end portion of the trailer body extends forwardly beyond the lower front end portion of the trailer body, to thereby form a trailer body overhang; said upper beams being located in a horizontal plane located just below the undersurface of the trailer body overhang.

6. The combination trailer-vehicle carrier of claim 5, and further comprising means forming a transversely-extending storage compartment below the trailer body overhang.

7. The combination trailer-vehicle carrier of claim 1, and further comprising a wear plate secured to lower surface areas of said upper beams adjacent to their front ends; said kingpin extending downwardly from said wear plate midway between said upper beams.

8. The combination trailer-vehicle carrier of claim 1, and further comprising road wheels recessed into the trailer body so that the outer exposed faces thereof are in approximate planar alignment with the trailer body side surfaces; said wheel support rails having approximately the same lateral spacing as said road wheels.

9. The combination trailer-vehicle carrier of claim 1 wherein said lower beams extend underneath the trailer body for substantially the entire longitudinal distance between the trailer body front and rear ends.

10. The combination trailer-vehicle carrier of claim 9 and further comprising multiple weld connections between said lower beams and said trailer body, whereby said lower beams are stiffened against bending.

11. The combination of claim 1, wherein said frame structure comprises a series of pillars extending between the upper beams and lower beams, and sheet metal side plates secured to the outboard side surfaces of said beams and pillars.

12. The combination of claim 1, wherein said upper beams extend forwardly from the trailer body a distance approximately the same as the length of the trailer body.

13. The combination of claim 1, and further comprising a wheel support ramp detachably connectable to the front end of each wheel support rail for movement of a wheeled vehicle onto or off of the rails.

* * * * *